June 16, 1931. J. DEUTSCH 1,810,466

DEVICE FOR GIVING ACCESS TO CAVITIES OF THE ANIMAL AND HUMAN BODY

Filed May 8, 1929

INVENTOR
JOSEF DEUTSCH
BY
ATTORNEYS

Patented June 16, 1931

1,810,466

UNITED STATES PATENT OFFICE

JOSEF DEUTSCH, OF VIENNA, AUSTRIA

DEVICE FOR GIVING ACCESS TO CAVITIES OF THE ANIMAL AND HUMAN BODY

Application filed May 8, 1929, Serial No. 361,304, and in Austria May 25, 1928.

In research and therapeutic work it is often desirable to provide for ready access to cavities in the animal and human bodies for a more or less long period of time.

The object of my invention is to provide a simple and efficient device of this character which can be readily applied to and eventually removed from an incision in the wall of the cavity hermetically closed to the outside and readily opened and expanded for observation or therapeutic purposes without causing any notable disturbances and anguish.

With this object in view my device consists of a sleeve of some impermeable yielding irresorbable material such as soft rubber and preferably of oblong transverse section such sleeve having secured to its outside and between its ends a flange of soft yielding irresorbable material, preferably of soft rubber; the outer end of such sleeve is provided with a readily removable closing device of any suitable or preferred construction and adapted to hermetically close the outer end of the sleeve.

The annexed drawings show by way of example embodiments of my device.

Figure 1:
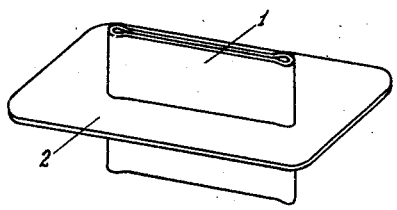
Figure 2:
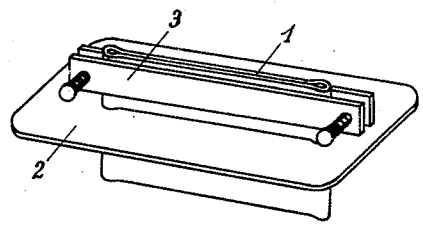
Figure 3:
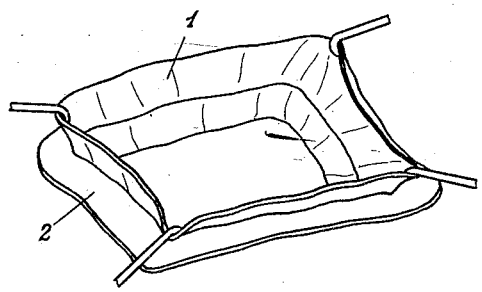
Figure 4:
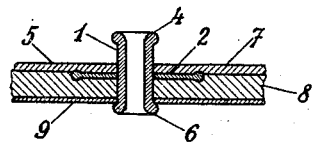

Fig. 1 is a perspective view of the device without the closing device, Fig. 2 is a similar view with the closing device applied to the outer end of the sleeve; Fig. 3 is a perspective view of the device in the open expanded state; Fig. 4 shows the device in transverse section applied to an abdominal cavity.

1 is a sleeve of some soft yielding irresorbable material such as soft rubber and 2 is a flange of soft flexible material such as soft rubber secured to the outside of the sleeve and 3 is a closing device of any suitable construction adapted to hermetically close the outer end of the sleeve when applied thereto.

As shown in Fig. 4 the outer edges 4 and 6 of the sleeve and the outer edge 5 of the flange 2 may be reinforced and rounded for preventing or reducing irritation of those parts of the body with which they come or may come into contact.

Assuming for example that the device has to be applied to the abdominal cavity as shown in Fig. 4 the inner part of the sleeve 1 is inserted into the incision previously made, so that its edge which is preferably reinforced and rounded as shown at 6 is within the peritoneum 9 while the flange 2 having reinforced and rounded edges 5 is between the skin 7 and the muscular layer 8 and the outer end of the sleeve with reinforced and rounded edges 4 projects beyond the skin. The flange is secured in position by usual sutures.

The outer end of the sleeve is then hermetically closed either by applying thereto a cement which, of course must be aseptic, or by mechanical means such as clamps as clearly shown in Fig. 2 of any suitable construction. The construction of such clamps does not form part of the present invention.

If it is desired to give access to the abdominal cavity it is only necessary to open the outer end of the sleeve by removing the clamp or by cutting the cement and then to expand the sleeve whereupon the outer end of the sleeve may be kept expanded by any suitable means as clearly shown in Fig. 3. After finishing the inspection or therapeutic work inside the abdominal cavity the outer end of the sleeve is released, so that the sleeve and the incision contract automatically and the outer end of the sleeve is again closed hermetically. In any case the sleeve should fit the incision as closely as possible.

In order to finally close again the incision the sutures and the device are removed and the incision is caused to naturally close in the manner usual in medicine. The invention is applicable not only to the abdominal cavity but also to other cavities of the animal and human body and is exceedingly useful in research and therapeutic work. It has been found by experiments that the device may be kept applied to the abdominal cavity of dogs without causing any particular trouble to them.

What I claim is:

1. A temporary closure for surgical incisions comprising a flange of soft, impermeable, irresorbable material adapted to be secured adjacent to said incision and provided with a narrow slit in registry therewith, and a sleeve of soft, impermeable, yielding, irresorbable material projecting outwardly from said flange at said slit and normally held thereby in a collapsed, sealed condition, said sleeve being capable of being widened to present a much larger opening to render the interior of the incision accessible therethrough.

2. A temporary closure for surgical incisions comprising a flange of soft, impermeable, irresorbable material adapted to be secured adjacent to said incision and provided with a narrow slit in registry therewith, and a sleeve of soft, impermeable, yielding, irresorbable material projecting in opposite directions from said flange at said slit, the inwardly extending portion of said sleeve being arranged to project into said incision, and the outwardly projecting portion thereof being normally held in a collapsed, sealed condition by said slit, and being capable of being widened to present a much larger opening to render the interior of the incision accessible therethrough.

In testimony whereof I have affixed my signature.

JOSEF DEUTSCH.